United States Patent Office 3,787,484
Patented Jan. 22, 1974

3,787,484
CARBOXYLIC DIESTERS AND THE METHOD FOR PREPARING THE SAME
André Bader and Francis Weiss, Pierre-Benite, France, assignors to Ugine Kuhlmann, Paris, France
No Drawing. Filed Feb. 2, 1968, Ser. No. 702,524
Claims priority, application France, Feb. 8, 1967, 94,173
Int. Cl. C07c 67/00, 69/16, 69/28, 69/52, 69/74, 69/78, 69/80
U.S. Cl. 260—488 H      9 Claims

ABSTRACT OF THE DISCLOSURE

Carboxylic diesters of 1,5-hexadiene-1,6-diol such as 1,6-diacetoxy-1,5-hexadiene and 1,6-di-isobutyryloxy-1,5-hexadiene are prepared by heating to a temperature, e.g., 150°–450° C. sufficiently high for a Cope transposition of the corresponding carboxylic diester of 1,5-hexadiene-3,4-diol.

BACKGROUND OF THE INVENTION

(I) Field of the invention

This invention relates to carboxylic diesters of 1,5-hexadiene-1,6-diol and to the method for preparing the same.

(II) Description of the prior art

The diacetate of 3,4-dimethyl-1,5-hexadiene-1,6-diol according to the literature (Chem. Abst., 1961, 55 8427b) is synthesized in a coupling reaction of organomagnesium compounds. The starting materials used for the synthesis are rarely used and difficult to obtain commercially; hence, the method described in the prior art is not suitable for large scale commercial operation.

On the other hand, the Cope transposition is a well-known reaction for the rearrangement of 1,5-hexadienic compounds. In a special situation when the 1,5-hexadienic compound is substituted at the 3 or possibly the 4 position with a hydroxyl group, the normal Cope transposition is modified because the Cope transposition product, which would be an enol, cannot exist alone and rearranges itself into a corresponding carboxylic derivative. The term "Oxy-Cope Rearrangement" has been proposed to describe this variant of the general reaction (see for example J. Am. Chem. Soc., 1964, 86, pp. 5017–5018). In addition, it is known that when the rearrangement is carried out with a disecondary 1,5-hexadiene-3,4-diol, the normal product of Oxy-Cope Rearrangement which would be an adipic dialdehyde, is not isolatable since it is cyclized immediately by internal crotonization into a cyclopentenic aldehyde (see for example Ann. Chim., 1934, 1, p. 55, C. R. Acad. Sc., Paris, 1966, 262, p. 567, series C).

Such an evolution is not unexpected because the extraordinary instability of the adipic dialdehyde has long been recognized. The instability of the adipic dialdehyde is due to the easiness of its structure to cyclize by internal aldolization or crotonization, for example, even during simple heating of their aqueous solutions. This instability coupled with the fact that there exist no economic process for making these compounds offer an explanation why these products up to now have not yet been industrially developed despite their particularly reactive dialdehyde structure. In fact, it is known that the dialdehydes are extremely valuable products because of their many applications particularly in the fields of textile dressings, in the paper industry, for chemical synthesis, for the preparation of polyacetals, as well as their known application as disinfectants, as bactericides and others.

SUMMARY OF THE INVENTION

We have discovered that carboxylic diesters of the formula

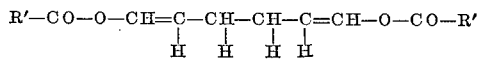

wherein each R' is an alkyl, an alkenyl, a cycloalkyl, an aryl or a heterocyclic radical containing 1 to 12 carbon atoms can be prepared by heating to a temperature sufficiently high for a Cope transposition, carboxylic diesters of 1,5-hexadiene-3,4-diol of the formula

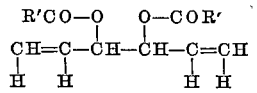

DESCRIPTION OF THE PREFERRED EMBODIMENTS

Even though the starting materials for the process of this invention are disubstituted at the 3 and 4 positions, we found that the Cope transposition took place normally without further rearrangement or transformation to produce the diesters of this invention which are the diesters of the dienol corresponding to adipic dialdehyde

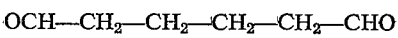

The transposition takes place wth good yields and the products obtained are sufficiently stable to undergo the necessary isolation and purification treatments, as well as for long term storage. The present invention thus offers an efficient and economic method for the production of stable new derivatives of adipic aldehyde which have applications either alone by virtue of their own structure or as agents for the synthesis of adipic aldehyde.

The starting materials, the carboxylic diesters of 1,5-hexadiene-3,4-diol of the formula

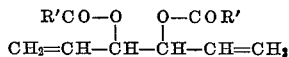

can be prepared readily by esterification of the corresponding 1,5-hexadiene-3,4-diol which in turn are obtained by reductive dimerization of unsaturated α,β aldehydes such as acrolein, methacrolein, crotonaldehyde, and cinnamaldehyde and its ring substituted derivatives. R' of the starting materials is a hydrocarbon radical which contains up to about 12 carbon atoms. Preferably the hydrocarbon radical is selected from the group consisting of alkyl, alkenyl, cycloakyl, aryl and heterocyclic radicals including such radicals when inertly substituted. When R' is an alkyl, it typically may be a straight chain alkyl or a branched alkyl containing 1 to 12 carbon atoms including methyl, ethyl-n-propyl, i-propyl, n-butyl, t-butyl, i-butyl, n-pentyl, 2-pentyl, n-hexyl, n-heptyl, 3-heptyl and n-dodecyl. When R' is an alkenyl, it may contain from 2 to 12 carbon atoms such as vinyl, allyl, propenyl, i-propenyl, 2-penten-2-yl or 3-hepten-3-yl. When R' is a cycloalkyl radical it may typically contain 3 to 12 carbon atoms including radicals such as cyclopropyl, cyclobutyl, cyclopentyl, cyclohexyl, cyclohexen-3-yl, 3-methylcyclohexen-3-yl, 4-methylcyclohexen-3-yl, and cyclododecyl. When R' is an aryl, it may be phenyl or naphthyl which may be mono-, bi- or tri-substituted by groups including alkyl containing 1 to 4 carbon atoms; halogens notably, fluoro, chloro and bromo radicals; and hydroxy, methoxy, ethoxy, carboxy, carbomethoxy, carboethoxy and methylol radicals. The suitable heterocyclic radicals include 2-tetrahydrofuryl; 2-furyl; 2-tetrahydropyranyl, 3,4-dihydro-(2N)-2-pyranyl; 1,3-dioxolan-2-yl; 2-thienyl, and 4-pyridyl.

The ease and the selectivity of the reaction according to the invention are quite surprising. Thus, with the esters of 1,2-divinyl-1,2-ethanediol, the simplest of the 1,5- hexadienes-3,4-diols, the transposition takes place with a yield which can exceed 80%, while the thermal transposition of the diol itself, which is complicated as has been said previously, would give a yield of 40%, according to published works in the literature. It could also be feared that the esters, as well as the starting esters of 1,5-hexadiene-3,4-diol which are of an allylic nature, that the enolic diesters of 1,5-hexadiene-1,6-diol prepared might undergo pyrolytic degradations or secondary rearrangements, as takes place for compounds of similar structure at high temperatures; however, these secondary degradations or rearrangements seem to be of minor importance.

The transposition reaction of the diesters of 1,5-hexadiene-1,6-diol is carried out by heating these materials to a temperature between about 150 and 450° C. This operation can be carried out in the liquid phase, by heating the starting materials themselves, or their solution in an inert, thermally stable solvent, such as an aliphatic or an aromatic hydrocarbon or an ether, for example, diphenyl ether.

The Cope transposition can be carried out at atmospheric pressure and can be effected, for example, at the boiling temperature of the mixture, or else if necessary, the operation can be carried out in an autoclave or a sealed tube. The transposition can also be carried out under reduced pressure and it is possible, when the operation is carried out at the boiling point of the system, to distill off part or all of the mixture during the reaction.

It is advantageous to add a small amount of a polymerization inhibitor, such as hydroquinone, the monomethyl ether of hydroquinone, t-butylcatechol, p-phenylenediamine or a copper salt in the amount of 0.01 to 1%. The required heating time, which is variable according to the temperature used and the nature of the product used, is generally in the order of about 0.5 to 5 hours.

The Cope transposition can also be carried out in a gas phase, by passing the starting diester vapors, possibly diluted with an inert gas such as nitrogen, carbon dioxide, or argon, through an empty tube, or one filled with inert packing designed to homogenize the temperature in the reactor. Such a packing can be made up of glass or steel balls, ceramic rings, sand, etc. The packing can be in the form of a fixed bed, or in the form of a fluidized bed using the inert gas and vapors as fluidizing gas. The residence time of the vapors in such a reactor can vary over wide limits; for example, the operation can be carried out with residence times between about 1 and 500 seconds.

The new compounds according to the invention can find numerous applications in various fields. In the first place, as has already been said, they can be used for synthesizing adipic aldehyde since, like enolic esters in general, they are easily hydrolyzed in a slightly acid medium. The compounds according to the invention can be utilized for example as agents for water disinfecting, in textiles, as bactericides, as reticulation and insolubilizing agents for proteins or for polyhydroxylated polymers, in textile dressings, in paper treatment, in the reticulation of polyvinyl alcohols, or other hydroxylated polymers, etc.

On the other hand, the two unsaturated ethylene groups can be put to use to carry out the reactions of polymerization or copolymerization with vinyl monomers such as vinyl acetate, vinyl ethers, acrylic and methacrylic nitriles or esters, styrene, the $\alpha$-olefins, etc.

To sum up, these are very interesting raw materials for the synthesis of numerous bi- or polyfunctional compounds, such as the 1,6-hexanediols and the hexamethylene-diamines, etc.

The following non-limiting examples illustrate the preparation of several diesters according to the invention.

EXAMPLE 1

Preparation of 1,6-diacetoxy-1,5-hexadiene

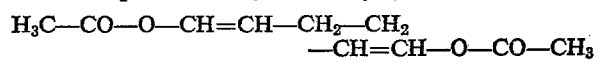

As starting material there was used 3,4-diacetoxy-1,5-hexadiene prepared by the action of acetic anhydride on 3,4-dihydroxy-1,5-hexadiene (divinylglycol), which had the following properties:

B.P.$_{0.5}$=59–62° C.; $n_D^{20}$=1.441; $d_4^{20}$=1.033

This product is a mixture of two diastereoisomers, and gas chromatography shows the presence of meso and racemic structures, in the approximate proportion of 60/40.

30 grams of the starting material (0.15 mole) were heated with reflux for two hours, at atmospheric pressure and at a temperature of 240° C. Then the products were separated by fractional distillation under a pressure of 0.5 mm. of mercury. There were first collected, at 60–65° C., 2 grams of unconverted 3,4-diacetoxy-1,5-hexadiene (0.01 mole), then at 76–78° C., 22.5 grams of a colorless liquid, $n_D^{20}$=1,465; $d_4^{20}$=1.049, which gas chromatography showed to be made up of a mixture of 94% 1,6-diacetoxy-1,5-hexadiene and of 4 to 5% of 1,6-diacetoxy-2,4-hexadiene. The latter product comes probably from a partial isomerization of 1,6-diacetoxy-1,5-hexadiene. There were thus obtained about 0.11 moles of 1,6-diacetoxy hexadiene, with a yield of 78 to 79% of the 3,4-diacetoxy converted. The 1,6-diacetoxy-1,5-hexadiene thus prepared was itself a mixture of geometric isomers in the following proportions, determined by gas chromatography and infrared spectrometry: 30% cis-cis isomer, 60% cis-trans isomer, 10% trans-trans isomer. The characteristic bands of the infrared spectrum of each of these isomers were the following (in cm.$^{-1}$):

cis-cis isomer: 3105, 3070, 1675, 1055, 750;
cis-trans isomer: 3110, 3085, 3070, 3040, 1680, 1100, 930, 750;
trans-trans isomer: 3100, 3040, 1680, 1100, 930.

The structure was further confirmed by the hydrogenation of the mixture of 1,6-diacetoxy-hexadiene in 1,6-diacetoxy-hexane, which proved to be identical to the product prepared by the acetylation of 1,6-hexanediol.

EXAMPLE 2

In this example the operation was carried out in the vapor phase, in a reactor consisting of a stainless steel tube 2 cm. in diameter and 100 cm. in length, bent into a U-shape and furnished with glass balls 3 mm. in diameter and filled up to 30 cm. The reactor was placed in an electric furnace and heated to 300° C. There was introduced into the reactor drop by drop under a stream of nitrogen at the rate of 10 liters/hour, measured under normal conditions, 15 grams per hour of 3,4-diacetoxy-1,5-hexadiene which was vaporized immediately on contact with the glass balls. At the outlet of the reactor the mixture of vapors and nitrogen was cooled by a water refrigerant, which condensed the greater part of the reaction products, then by a solid carbon dioxide refrigerant. The operation took two hours using 30 grams of raw material (0.15 mole).

There was collected 28.8 grams of pyrolyzate, analysis of which gave the following results:

51% by weight of untransformed 3,4-diacetoxy-1,5-hexadiene (i.e., 49% of the amount used);
40.6% by weight of 1,6-diacetoxy-1,5-hexadiene of which the distribution of the geometric isomers was the following: 29.5% of cis-cis, 54% of cis-trans, 16.5% of trans-trans;
4.2% by weight of 1,6-diacetoxy-2,4-hexadiene.

With respect to the 3,4-diacetoxy-1,5-hexadiene transformed, the yield was 76.5% of 1,6-diacetoxy-1,5-hexadiene and 8% of 1,6-diacetoxy-2,4-hexadiene, i.e., 84.5% of the rearrangement products.

EXAMPLE 3

The same reactor used in Example 2 was employed but at a temperature of 350° C. and the feeding was 5-grams of 3,4-diacetoxy-1,5-hexadiene in 3 hours, under a stream of nitrogen at the rate of 10 liters/hour.

There was collected 48 grams of pyrolyzate, of which analysis gave the following results:

10.5% by weight of untransformed 3,4-diacetoxy-1,5-hexadiene (i.e., 10% of the starting amount);
60.5% by weight of 1,6-diacetoxy-1,5-hexadiene of which the distribution of the geometric isomers was: 26.5% of cis-cis, 55% of cis-trans, 18.5% of trans-trans;
4.2% by weight of 1,6-dicetoxy-2,4-hexadiene-2,4.

The yield was 64.5% of 1,6-dicetoxy-1,5-hexadiene and 4.5% of 1,6-dicetoxy-2,4-hexadiene-2,4, i.e., 69% of the total with respect to the 3,4-diacetoxy-1,5-hexadiene transformed.

EXAMPLE 4

Preparation of 1,6-di-isobutyryloxy-1,5-hexadiene

The starting material used was the diisobutyrate of divinylglycol (3,4-di-isobutyryloxy - 1,5 - hexadiene) prepared by the reaction of isobutyryl chloride on divinylglycol. The product used which had the following properties:

B.P.$_1$=83.84° C.; $n_D^{20}$=438; $d_4^{20}$=0.968 was a mixture of diastereoisomers with a meso/racemic proportion of about 60/40.

Use was made of the same appartus as in Examples 2 and 3, heated to 300° C., into which was introduced 20.5 grams of divinylglycol diisobutyrate over the course of 100 minutes, under a stream of nitrogen at the rate of 10 liters/hour. There was collected 19.8 grams of pyrolyzate, of which analysis gave the following results:

43% by weight of untransformed divinylglycol disiobutyrate (i.e., 41.5% of the starting amount);
51% by weight of 1,6-di-isobutyryloxy-1,5-hexadiene made up of 30% of the cis-cis isomer, 53% of the cis-trans isomer, 17% of the trans-trans isomer, according to analysis by infrared spectrometry;
2.5% by weight of 1,6-di-isobutyryloxy-2,4-hexadiene.

The product was rectified under reduced pressure, and there was obtained the mixture of the 1,6-diisobutyryloxy-hexadienes in the form of a colorless liquid B.P.$_1$=110–130° C.; $n_D^{20}$=1.465; $d_4^{20}$=0.980

The yield with respect to transformed divinylglycol diisobutytrate was 84% for 16-diisobutyryloxy-hexadiene and 4% for 1,6-diisobutyryloxy-2,4-hexadiene, i.e., a total of 88%.

We claim:
1. A carboxylic diester of the formula:

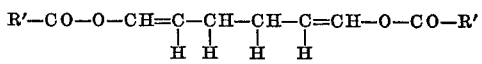

wherein each R′ is an alkyl, an alkenyl, a cycloalkyl or a hydrocarbon aryl containing 1 to 12 carbon atoms.
2. 1,6-diacetoxy-1,5-hexadiene.
3. 1,6-di-isobutyryloxy-1,5-hexadiene.
4. A method for preparing a carboxylic diester of the formula:

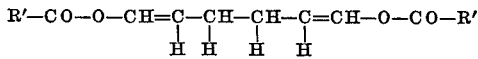

wherein each R′ is an alkyl, an alkenyl, a cycloalkyl or a hydrocarbon aryl containing 1 to 12 carbon atoms, which method comprises heating to a temperature between 150°–450° C. sufficiently high for a Cope transposition of a carboxylic diester of 1,5-hexadiene-3,4-diol of the formula

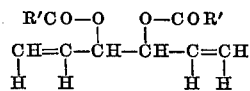

wherein R′ each has the same corresponding meaning as stated above, and thereafter recovering the transposed diester therefrom.
5. A method according to claim 4 wherein the Cope transposition is carried out in a liquid phase.
6. A method according to claim 4 wherein the Cope transposition is carried out in the presence of an inert and thermally stable solvent for 1,5-hexadiene-3,4-diol.
7. A method according to claim 4 wherein the Cope transposition is carried out in the presence of a polymerization inhibitor.
8. A method according to claim 4 wherein the Cope transposition is carried out in a gaseous phase.
9. A method according to claim 8 wherein the Cope transposition is carried out in the presence of an inert gas.

References Cited

Tetrahedron Letters, No. 49, pp. 6115–6119, 1966.
Chem. Abstracts, 55:8427b.

VIVIAN GARNER, Primary Examiner

U.S. Cl. X.R.

260—295 R, 332.2 C, 340.7, 345.8, 347.5, 410.6, 468 H, 468 R, 469, 473 R, 473 S, 475 FR, 475 N, 475 P, 476 R, 486 R, 491, 999

UNITED STATES PATENT OFFICE
CERTIFICATE OF CORRECTION

Patent No. 3,787,484      Dated January 22, 1974

Inventor(s) Andre Bader and Francis Weiss

It is certified that error appears in the above-identified patent and that said Letters Patent are hereby corrected as shown below:

column 2, line 27 "place wth" should read --place with--.
column 2, line 39 "CH=CH$_2$" should read --CH-CH$_2$--.
column 2, line 48 "cycloakyl" should read --cycloalkyl--.
column 2, line 61 "naphthyl" should read --naptyl--.
column 4, line 17 "1,465" should read --1.465--.
column 5, line 10 "1,6-dicetoxy" should read --1,6-diacetoxy--.
column 5, line 12, "1,6-dicetoxy" should read --1,6-diacetoxy--.
column 5, line 23 "=438" should read -- =1.438 --.
column 5, line 34 "disiobuty-" should read -- diisobuty----.
column 5, line 48 "isobulytrate" should read --isobutyrate--.
column 5, line 48 "16-diisobutyryloxy" should read
    --1,6-diisobutyryloxy--.

claim 1:
    column 6, line 6 "aryl containing" should read
--aryl radical containing--.
claim 4:
    column 6, line 15 "aryl containing" should read
--aryl radical containing--.

Signed and sealed this 1st day of October 1974.

(SEAL)
Attest:

McCOY M. GIBSON, JR.      C. MARSHALL DANN
Attesting Officer      Commissioner of Patents